(12) United States Patent
Senda et al.

(10) Patent No.: US 7,279,805 B2
(45) Date of Patent: Oct. 9, 2007

(54) VEHICLE POWER SUPPLY SYSTEM WITH A SERIES REGULATOR

(75) Inventors: Takashi Senda, Niwa-gun (JP);
Katsunori Tanaka, Haguri-gun (JP);
Akira Kato, Kani (JP)

(73) Assignee: Denso Corporation, Kariya (JP)

( * ) Notice: Subject to any disclaimer, the term of this patent is extended or adjusted under 35 U.S.C. 154(b) by 311 days.

(21) Appl. No.: 11/073,891

(22) Filed: Mar. 8, 2005

(65) Prior Publication Data

US 2005/0212438 A1  Sep. 29, 2005

(30) Foreign Application Priority Data

Mar. 29, 2004  (JP) ............... 2004-096890

(51) Int. Cl.
*B60L 1/00* (2006.01)
*B60L 3/00* (2006.01)
*H02G 3/00* (2006.01)

(52) U.S. Cl. .................................... 307/10.1
(58) Field of Classification Search ............ 307/10.1
See application file for complete search history.

(56) References Cited

U.S. PATENT DOCUMENTS

| 5,635,771 A | 6/1997 | Mertl et al. ............. 307/10.1 |
| 5,668,461 A * | 9/1997 | Hancock et al. ............. 320/103 |
| 6,215,283 B1 * | 4/2001 | Desroches et al. ............ 322/15 |
| 2003/0160510 A1 * | 8/2003 | Mizutani et al. ............ 307/10.1 |

FOREIGN PATENT DOCUMENTS

| JP | A 06-351172 | 12/1994 |
| JP | A 08-172730 | 7/1996 |
| JP | A 2002-218603 | 8/2002 |

* cited by examiner

*Primary Examiner*—Michael Sherry
*Assistant Examiner*—Carlos Amaya
(74) *Attorney, Agent, or Firm*—Oliff & Berridge, PLC

(57) ABSTRACT

A vehicle power supply system has a first battery connected to a generator, a second battery connected to an electric load and a series regulator between the first battery and the second battery. A control unit controls an input voltage of the series regulator and the output voltage of the series regulator based on a temperature of the series regulator, an output voltage of the series regulator and a load amount of the electric load. The control unit specifically controls an input upper limit voltage value of the series regulator to change an allowable value of a voltage difference between input and output of the series regulator.

7 Claims, 3 Drawing Sheets

VEHICLE POWER SUPPLY SYSTEM WITH A SERIES REGULATOR

CROSS REFERENCE TO RELATED APPLICATION

This application is based on and incorporates herein by reference Japanese Patent Application No. 2004-96890 filed on Mar. 29, 2004.

FIELD OF THE INVENTION

The present invention relates to a vehicle power supply system, in which in an electric circuit of a vehicle including a first battery connected to an electric power generator, a second battery connected to an electric load and having an open circuit voltage lower than that of the first battery, and a series regulator connecting the two batteries. The present invention particularly relates to a vehicle power supply system, which improves power supply efficiency and fuel consumption by controlling the series regulator.

BACKGROUND OF THE INVENTION

In a vehicle, electric loads are directly connected to an electric power generator which is coupled to an engine. When a generated voltage is changed in order to raise the regenerative effect of electric energy, for example, when the generated voltage is raised at a time of vehicle deceleration, a change in the brightness of a headlight or the like is caused from the voltage fluctuation, or the life of the headlight is shortened.

As a countermeasure against this, electric power is supplied to an electric load through a DC/DC converter. However, a large-capacity chopper-type DC/DC converter, which can feed electric loads of the whole vehicle, has a large size and is expensive.

As a low cost power supply system, it is proposed to supply a generated voltage to an electric load through a series regulator. Power supply efficiency at a time when a voltage is adjusted by the series regulator is proportional to a voltage difference between the input and output of the series regulator. Here, the power supply efficiency is the ratio of output power (supply power to the electric load) from the series regulator to input power to the series regulator. As the voltage difference between the input and output of the series regulator becomes large, the power supply efficiency is reduced.

That is, the power equivalent to the reduction in the power supply efficiency is consumed in the series regulator and generates heat. Therefore, in the case where large power is supplied to the electric load, when the operation is performed at a point where the voltage difference between the input and output is large and the power supply efficiency is low, the heat generation of the series regulator is large. Thus, an erroneous operation or a failure of component parts of the circuit occurs.

SUMMARY OF THE INVENTION

It is an object of the present invention to provide a power supply system in which a voltage difference between input and output of a series regulator is controlled according to an amount of an electric load, so that the series regulator is protected, and power supply efficiency and fuel consumption are improved.

According to the present invention, electric power of an electric power generator is supplied to an electric load through a series regulator, and is supplied while being controlled to a stable voltage value. Besides, a load amount of the electric load, a temperature of the series regulator and an output voltage value thereof are always detected, the maximum allowable loss of the series regulator is calculated. On the basis of this calculation, the series regulator is controlled thereby to limit the loss to be less than the maximum allowable loss. Thus, the stable operation of the series regulator is ensured, and it is possible to realize the improvement of the power supply efficiency of the whole power supply system and the improvement of the fuel consumption of the vehicle.

Preferably, the maximum allowable loss of the series regulator is calculated from detection values of the load amount of the electric load and the temperature of the series regulator. An allowable value of a voltage difference between the input and output of the series regulator is determined. Since the allowable value of the voltage difference is controlled by changing an input upper limit voltage, the output voltage value as supply power to the electric load is not changed, and stable power supply becomes possible.

The upper limit voltage value of the series regulator is always updated and controlled on the basis of monitor data of states of the series regulator and the electric load. As a result, the series regulator is protected, and the power supply efficiency and the fuel consumption are improved.

The load current of the electric load changes, and the temperature of the series regulator changes. Thus, when the control of the input-output voltage difference of the series regulator is performed only by the series regulator, the control becomes complicated. However, when the control is shared by separate components, for example, the control of the input voltage is performed by controlling the generator, and the control of the output voltage is performed by controlling the series regulator, the input-output voltage difference can be easily controlled.

The maximum input voltage of the series regulator is always calculated on the basis of information of the series regulator and the electric load, at a time of vehicle declaration or the like. The output voltage of the generator is raised up to the input voltage limit value of the series regulator. Thus, the energy regeneration can be raised up to the maximum value, and therefore the fuel consumption efficiency in the vehicle can be improved.

Preferably, when a required power of the electric load becomes the maximum allowable power of the series regulator or higher, a control unit closes a switch to supply the power to the electric load directly from the generator. Thus, the series regulator is protected, while at the same time continuing the power supply to the electric load.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Hereinafter, an embodiment a vehicle power supply system will be described.

Figure 1:
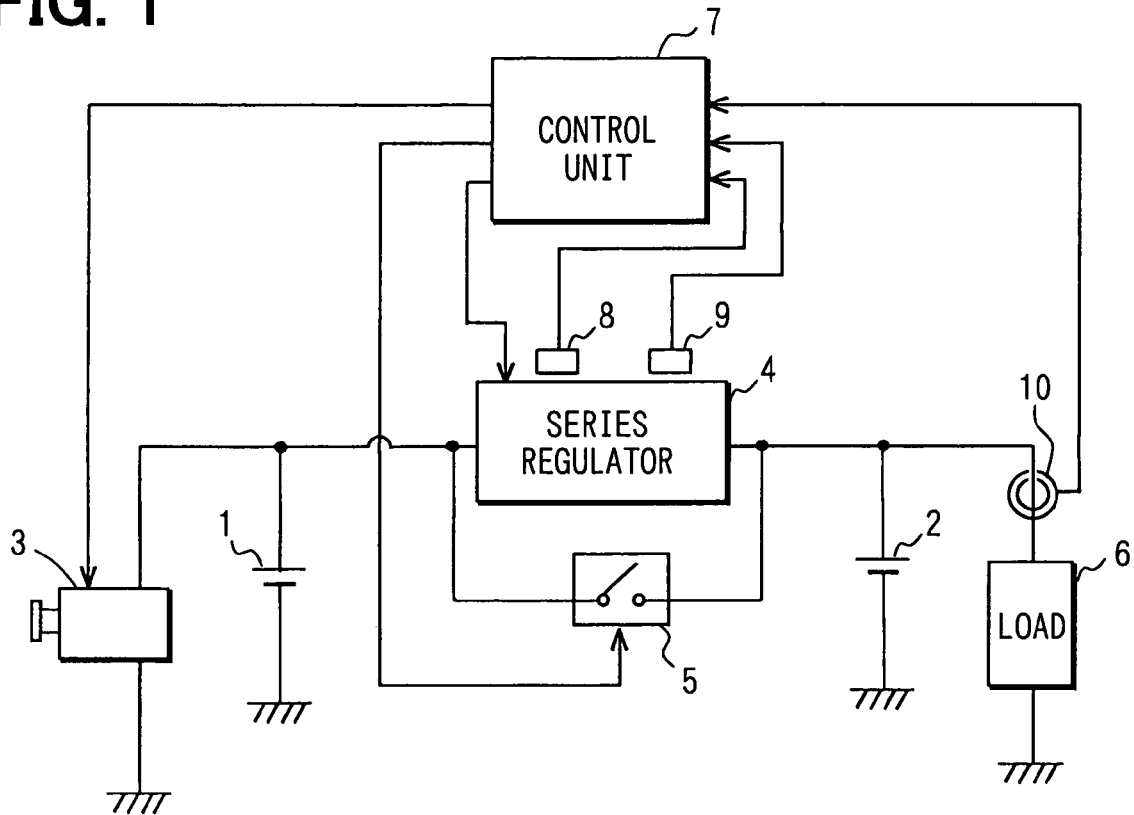
FIG. 1 is a structural diagram showing an embodiment of a power supply system according to the present invention.
Figure 2:
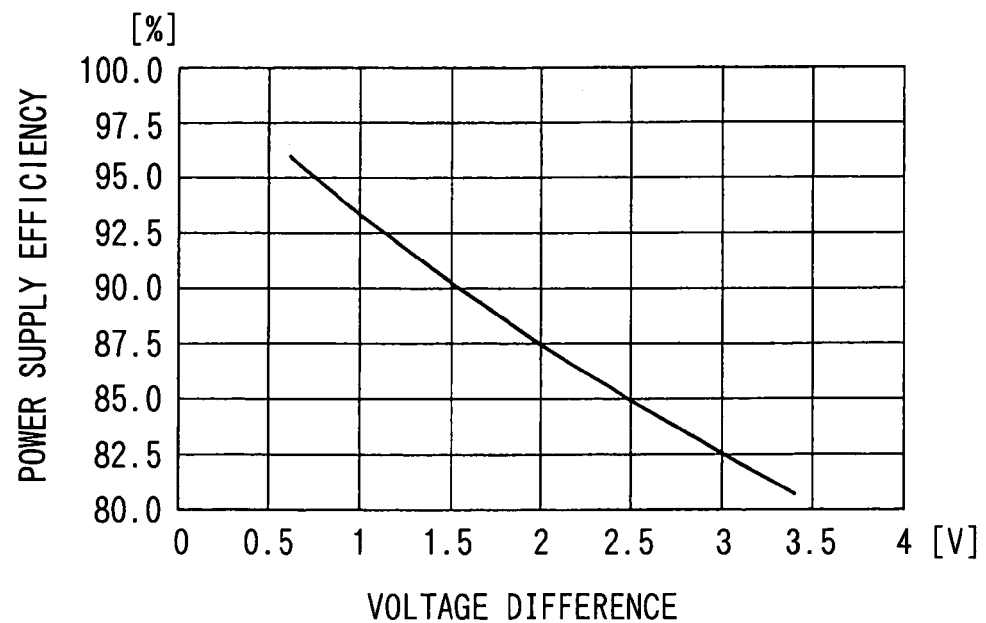
FIG. 2 is a graph showing an efficiency relative to an input-output voltage difference of a series regulator in the embodiment.

In FIG. 1, a vehicle power supply system has a first battery 1 and a second battery 2 for an electric load 6. The output of an electric power generator (alternator) 3 coupled to and driven by an engine (not shown) of a vehicle is connected to the positive electrode of the first battery 1 and the input terminal of a series regulator 4. The series regulator 4 has a characteristic that its power supply efficiency is reduced as the voltage difference between the input and output becomes large as shown in FIG. 2.

The output terminal of the series regulator 4 is connected to the positive electrode of the second battery 2 and the electric load 6. The generator 3 and negative electrodes of the first battery 1 and the second battery 2 are grounded. Further, a switch 5 is connected in parallel to the series regulator 4 between the first battery 1 and the second battery 2. Thus, electric power from the generator 3 is supplied to the electric load 6 through the series regulator 4 or the switch 5.

An electronic control unit 7 is connected to control the generator 3, the series regulator 4 and the switch 5. Besides, a temperature detector 8 to detect the temperature of the series regulator 4, an output voltage detector 9 to detect the output voltage of the series regulator 4, and an electric load amount detector 10 are connected to the control unit 7.

In the normal running state of the vehicle, the generator 3 is driven by the engine and generates alternating current (AC) power. The generator 3 includes rectifiers. The AC power generated by the generator 3 is full-wave rectified by the rectifiers, and is outputted as DC power. The outputted DC power is applied to the input terminal of the series regulator 4 and the first battery 1. At this time, the switch 5 is in held an open state by the control unit 7. The power applied to the series regulator 4 is converted into a specified output voltage by the series regulator 4 according to instructions from the control unit 7, and is outputted to the second battery 2 to which the electric load 6 is connected.

The control unit 7 calculates an input upper limit voltage on the basis of data from the temperature detector 8, the output voltage detector 9 and the electric load amount detector 10 and the maximum allowable power, which is stored in the control unit 7, of component parts constituting the series regulator 4, and issues instructions of output voltage to the generator 3.

Next, when certain conditions occur at the same time, for example, when the temperature of the series regulator 4 is high and the requested load power of the electric load 6 becomes the maximum allowable power or more of the component parts constituting the series regulator 4, the control unit 7 issues an instruction to close the switch 5. Accordingly, the power is directly supplied from the generator 3 to the electric load 6 through the switch 5 without passing through the series regulator 4. Thus, the series regulator 4 is protected against excessive heat generation. At the same time, the normal operation of the electric load 6 can be ensured.

A calculation processing of the input upper limit voltage of the series regulator 4 of the power supply system will be specifically described.

Figure 3:
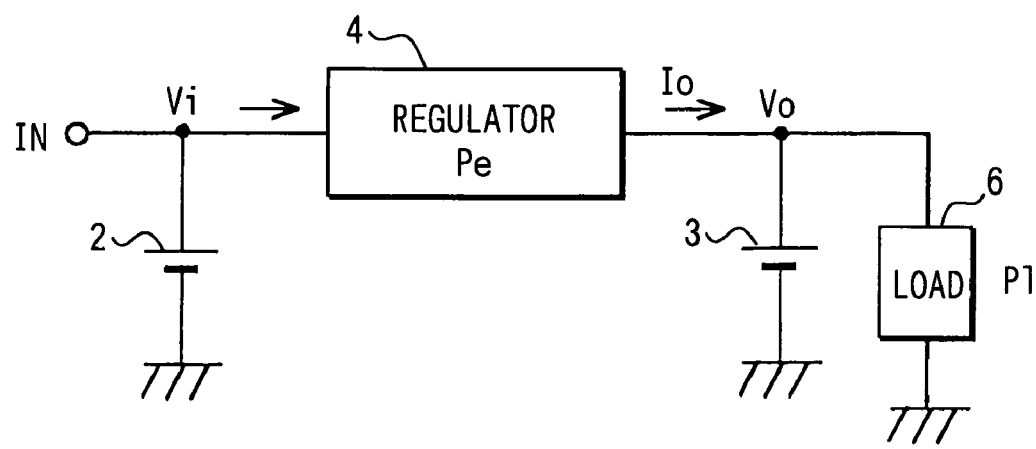
FIG. 3 is a circuit diagram showing input-output voltages of the series regulator and a supply current in the embodiment.
Figure 4:
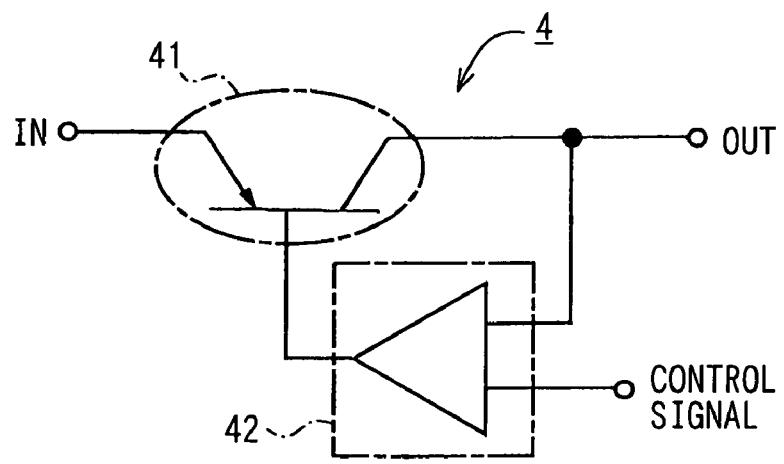
FIG. 4 is a circuit diagram showing the series regulator in the embodiment.

FIG. 3 shows a relation between input-output voltage and current with respect to the series regulator 4 and the electric load 6 of FIG. 1. The series regulator 4 has a structure shown in FIG. 4, and the foregoing component parts include semiconductor device 41 such as a transistor.

When an input voltage is Vi, an output voltage is Vo, a supply current is Io, an electric load power is P1, component parts allowable loss is Pe, and component parts temperature is Te, the following expression is established.

$$Vi=(Pe/Io)+Vo=Pe\times(Vo/P1)+Vo \quad (1)$$

Here, as shown in FIG. 1, Vo and P1 are detected by the output voltage detector 9 and the electric load amount detector 10.

Assuming the detected data are as indicated below, the input voltage (Vi) is calculated as explained hereafter.
Vo=13.8 V
P1=414 W
Te=100° C.

Figure 5:
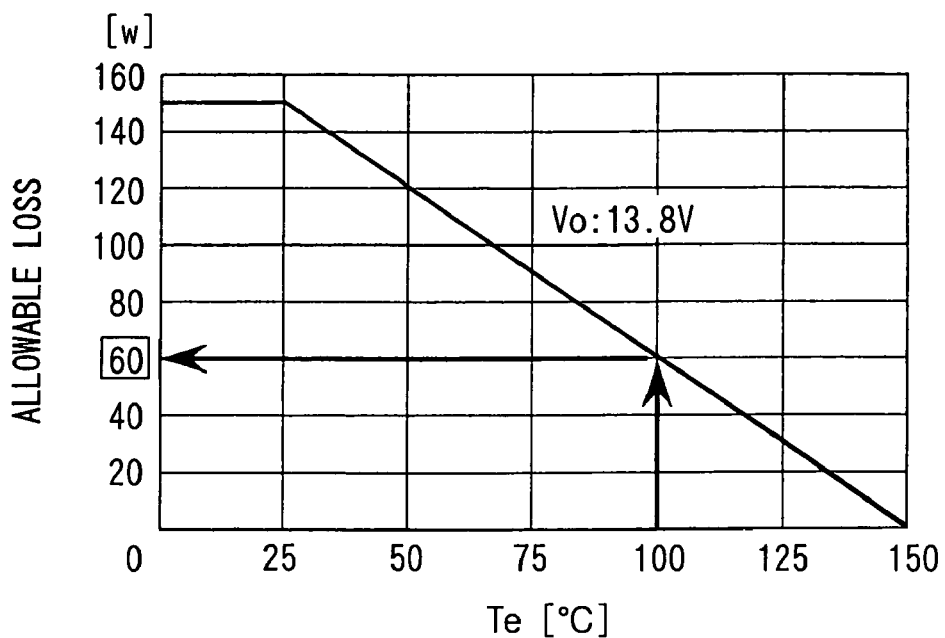
FIG. 5 is a graph showing an component parts allowable loss relative to an component parts temperature of the series regulator.

Here, Pe is obtained in a following manner. Since the temperature of the component parts is 100° C., and Vo is 13.8 V, as shown in FIG. 5, Pe becomes 60 W. Incidentally, data used for obtaining the allowable loss on the basis of the component parts temperature is previously stored in an ECU constituting the control unit 7.

Accordingly, from expression (1), $$Vi=Pe\times(Vo/P1)+Vo=60\times(13.8/414)+13.8=2+13.8=15.8$$

The input voltage (Vi) is calculated as 15.8 V. That is, this value becomes the input upper limit voltage of the series regulator 4 under the above condition.

The input-output voltage difference of the series regulator at this time becomes 2 V. Accordingly, when the component parts temperature and the output voltage Vo are unchanged (for example, Te=100° C., Vo=13.8 V), a possible supply power which can be supplied to the electric load 6 becomes infinitely large by making the input voltage (Vi) approach to the output voltage (Vo) (the input-output voltage difference is made to approach to zero). However, actually, it is restricted by the maximum current which can pass through the component parts, transistor 41, of FIG. 4.

Figure 6:
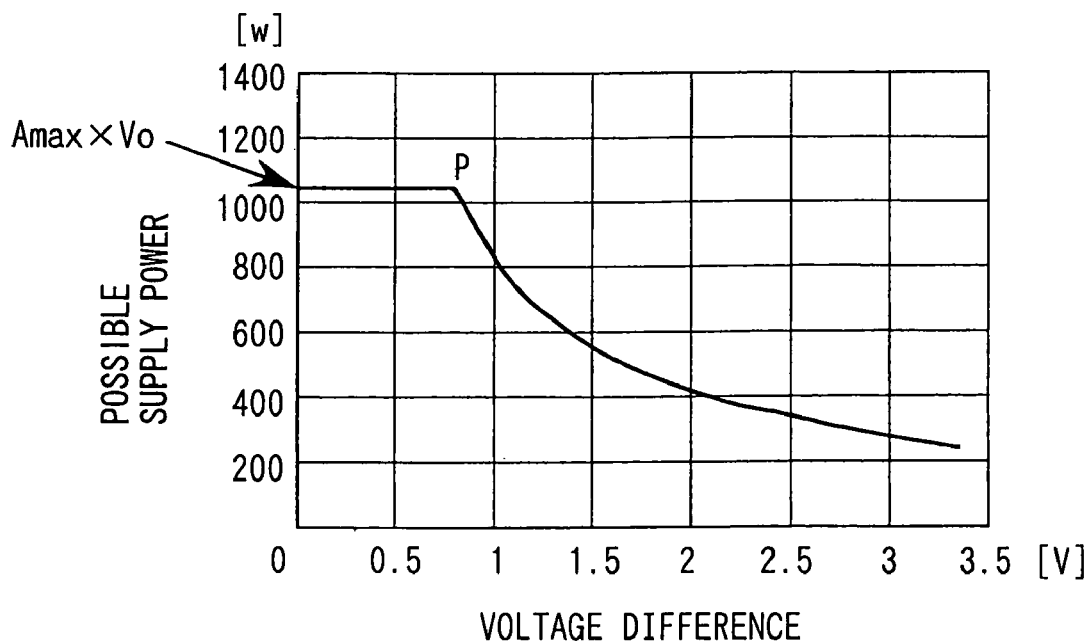
FIG. 6 is a graph showing a possible supply power relative to an input-output voltage difference of the series regulator.

Under the above condition (Vo=13.8 V, Te=100° C.), the possible supply power is calculated based on the input-output voltage difference of the series regulator 4. This calculation result is shown as a graph in FIG. 6. As the input-output voltage difference (V) indicated on the horizontal axis becomes small, the maximum supply power (W) becomes large. However, it is understood that the maximum supply power saturates at a point P by the maximum current (Amax) which can pass through the component parts 41.

This characteristic is defined by the following expression derived from expression (1).

$$P1=(Pe\times Vo)/(Vi-Vo)$$

Here, since P1 is equivalent to the maximum supply power (Pmax) of the series regulator, $$Pmax=(Pe\times Vo)/(Vi-Vo) \quad (2)$$

As the detection unit for detecting the electric load amount, various methods can be selectively used. For example, the electric load amount Pl can be detected from the output of a current detector for directly detecting current supplied to the electric load, from operating states of operating electric loads among plural electric loads or from an instruction value to the component parts 41 in the series regulator 4.

The present invention is not limited to the above embodiment, but may be modified in many other ways without departing from the spirit of the invention.

What is claimed is:

1. A vehicle power supply system comprising:
    a first battery connected to a generator driven by an engine of a vehicle;
    a second battery connected to an electric load and having an open circuit voltage lower than that of the first battery;
    a series regulator connecting the first battery and the second battery;
    detection means which detect a temperature of the series regulator, an output voltage of the series regulator and a load amount of the electric load; and
    a control unit which controls an input voltage of the series regulator and the output voltage of the series regulator on the basis of detection values of the detection means,
    wherein the control unit controls an input upper limit voltage value of the input voltage of the series regulator to change an allowable value of a voltage difference between input and output of the series regulator, and
    wherein the input upper limit voltage value of the series regulator is calculated by a maximum allowable power of a component part of the series regulator, a detection value of a temperature of the component part, a detection value of the output voltage of the series regulator and a detection value of the load amount of the electric load.

2. The vehicle power supply system according to claim 1, wherein the control unit controls an output voltage of the generator to control the input voltage of the series regulator, and the control unit controls the series regulator to control the output voltage of the series regulator.

3. The vehicle power supply system according to claim 2, wherein the control of the output voltage of the generator raises the output voltage within a range equal to or less than the input upper limit voltage value of the series regulator.

4. The vehicle power supply system according to claim 1 further comprising:
    a switch connected in parallel to the series regulator between the first battery and the second battery,
    wherein switching of the switch is controlled by the control unit.

5. The vehicle power supply system according to claim 1, wherein the control unit is installed at a position away from the generator.

6. The vehicle power supply system according to claim 1, wherein detection of the load amount of the electric load by the detection means is performed by one of direct detection by a current detector, an estimation from an operating state of each electric load and an estimation from an instruction value from the control unit to the component part in the series regulator.

7. The vehicle power supply system according to claim 1, wherein the control unit stores the allowable power of the component part of the series regulator as a continuous function of the temperature of the component part.

* * * * *